United States Patent [19]

Soodak et al.

[11] 3,967,113
[45] June 29, 1976

[54] WAVELENGTH-CORRECTED SPECTROFLUOROMETER

[75] Inventors: Charles Soodak, Silver Spring; James H. Macemon, Glen Burnie, both of Md.

[73] Assignee: Baxter Laboratories, Inc., Deerfield, Ill.

[22] Filed: Dec. 5, 1974

[21] Appl. No.: 530,053

[52] U.S. Cl. .............................. 250/214 C; 356/97
[51] Int. Cl.² ........................................ H01J 39/12
[58] Field of Search .................... 356/96, 97, 85; 250/461 B, 214 R, 573–577, 214 C

[56] References Cited
UNITED STATES PATENTS

| | | | |
|---|---|---|---|
| 3,553,444 | 1/1968 | Tong | 356/96 |
| 3,561,873 | 2/1971 | Hooper | 356/96 |
| 3,582,659 | 6/1969 | Dekker | 250/214 |
| 3,676,005 | 7/1972 | Chance | 356/97 |
| 3,811,781 | 5/1974 | Lowy | 356/97 |
| 3,854,818 | 12/1974 | Bohler et al. | 356/85 |
| 3,883,248 | 5/1975 | Rakhovsky et al. | 356/85 |

Primary Examiner—Alfred E. Smith
Assistant Examiner—D. C. Nelms
Attorney, Agent, or Firm—Herman L. Gordon; Richard G. Kinney

[57] ABSTRACT

A spectrofluorometer providing wavelength correction by means of an arbitrary function generator driven by a wavelength scanning element of the spectrofluorometer. The arbitrary function generator may be driven by the emission scanning monochromator to derive a wavelength-dependent voltage signal which is combined with the measure photomultiplier output to thereby provide a base-line compensated resultant output signal. Alternatively, the arbitrary function generator may be driven by the excitation scanning monochromator to derive a wavelength-dependent voltage signal which is combined with the output of a reference photomultiplier tube receiving part of the output of the excitation monochromator to derive an excitation-corrected reference signal which is in turn combined with the measure photomultiplier tube output signal to thereby provide an energy-corrected resultant output signal. An analog divider may be employed to divide this last-named resultant output signal by said excitation wavelength-dependent voltage signal to thereby derive a quantum-corrected fluorescence emission output signal. The arbitrary function generator has successive incremental wavelength range segments provided respectively with independently adjustable potentiometers to suitably shape the wavelength-dependent voltage signal curve.

26 Claims, 8 Drawing Figures

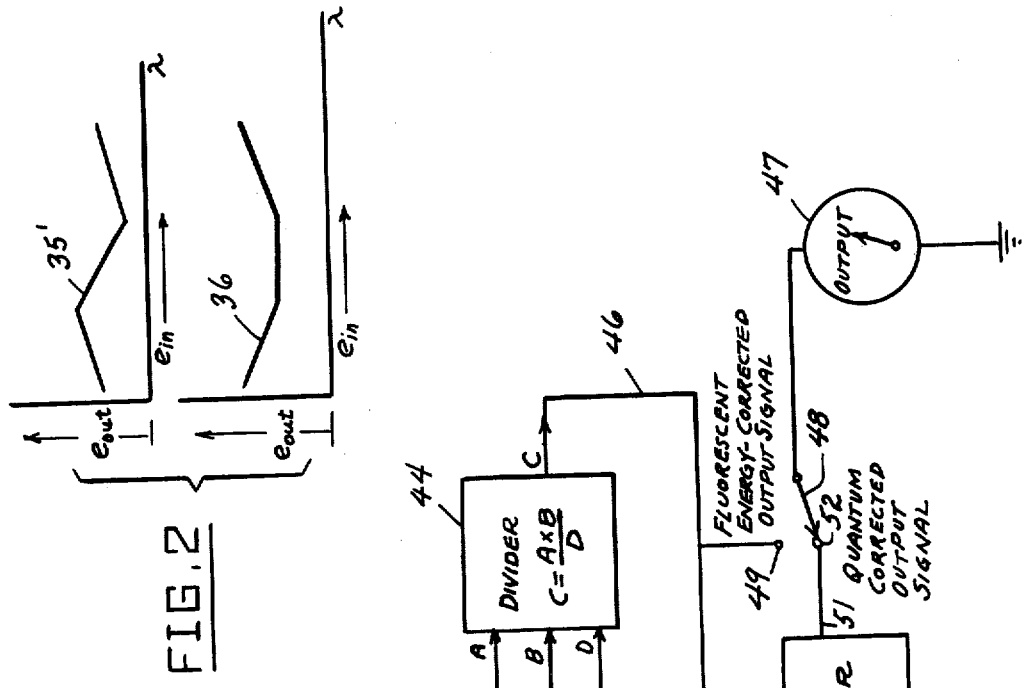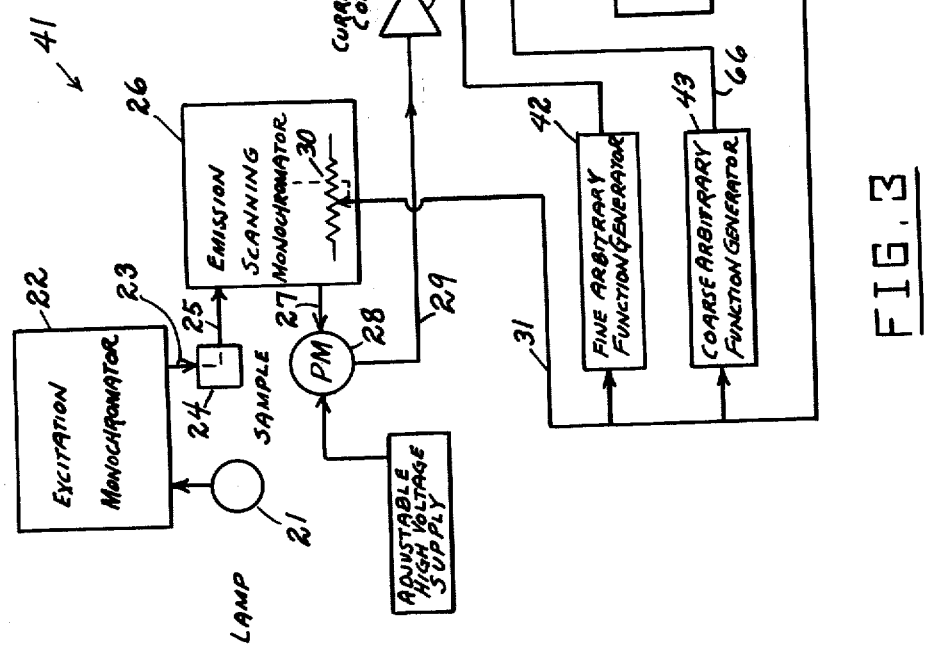

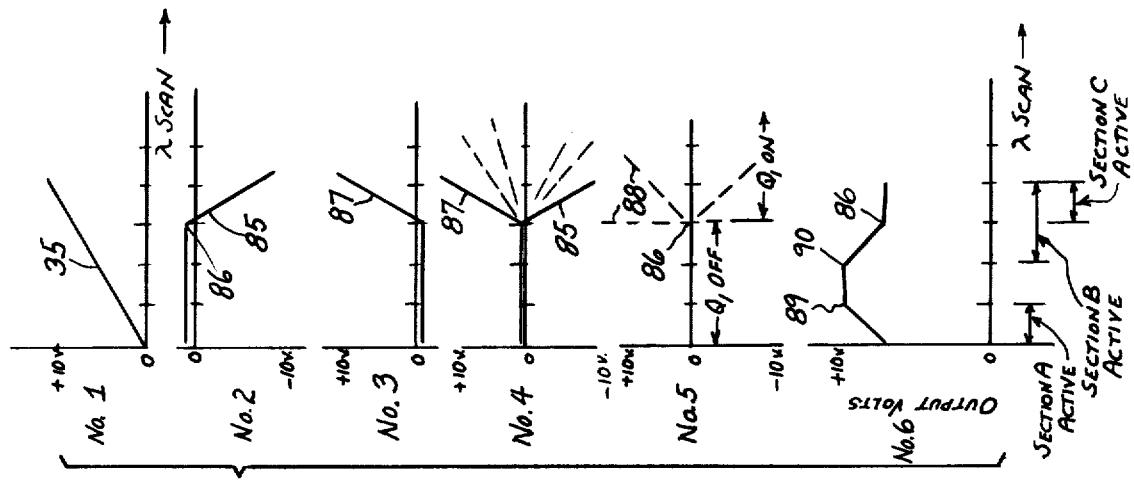
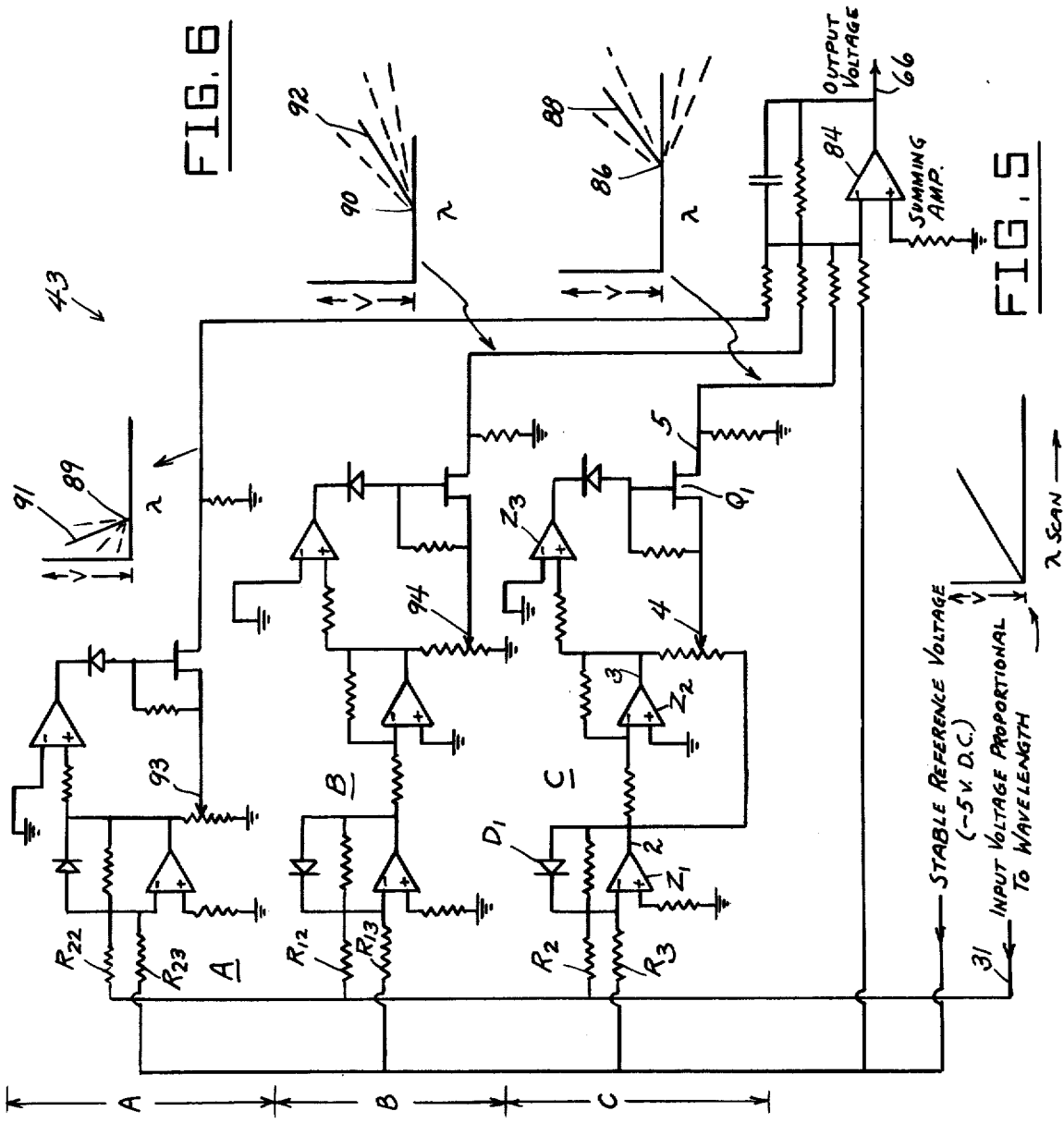
FIG. 6
FIG. 5

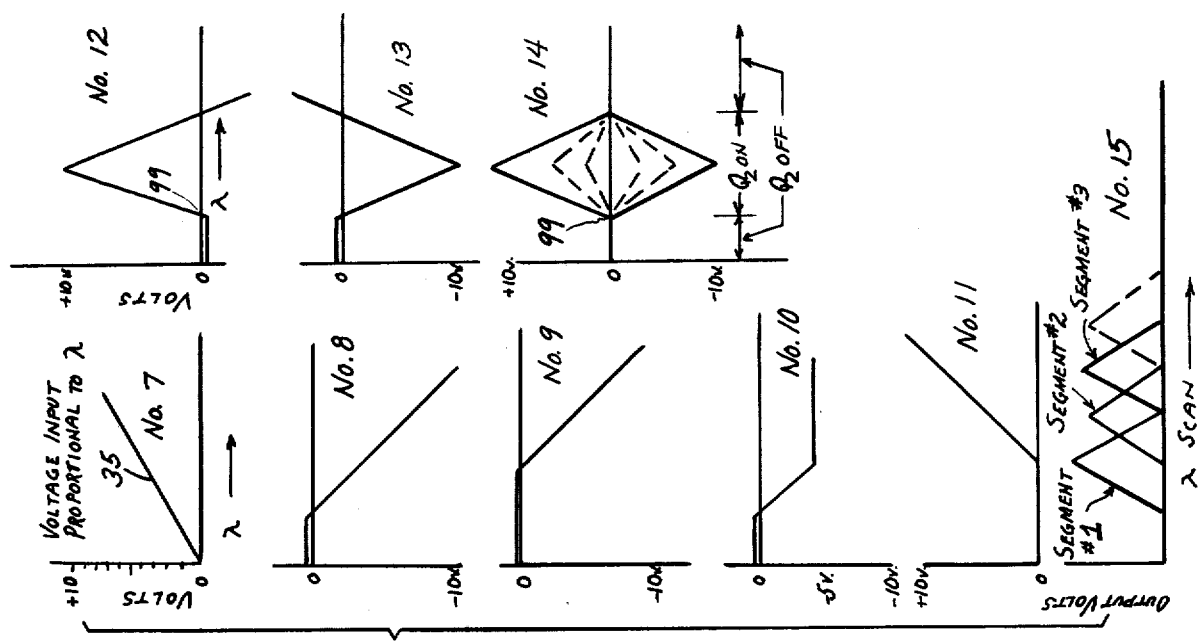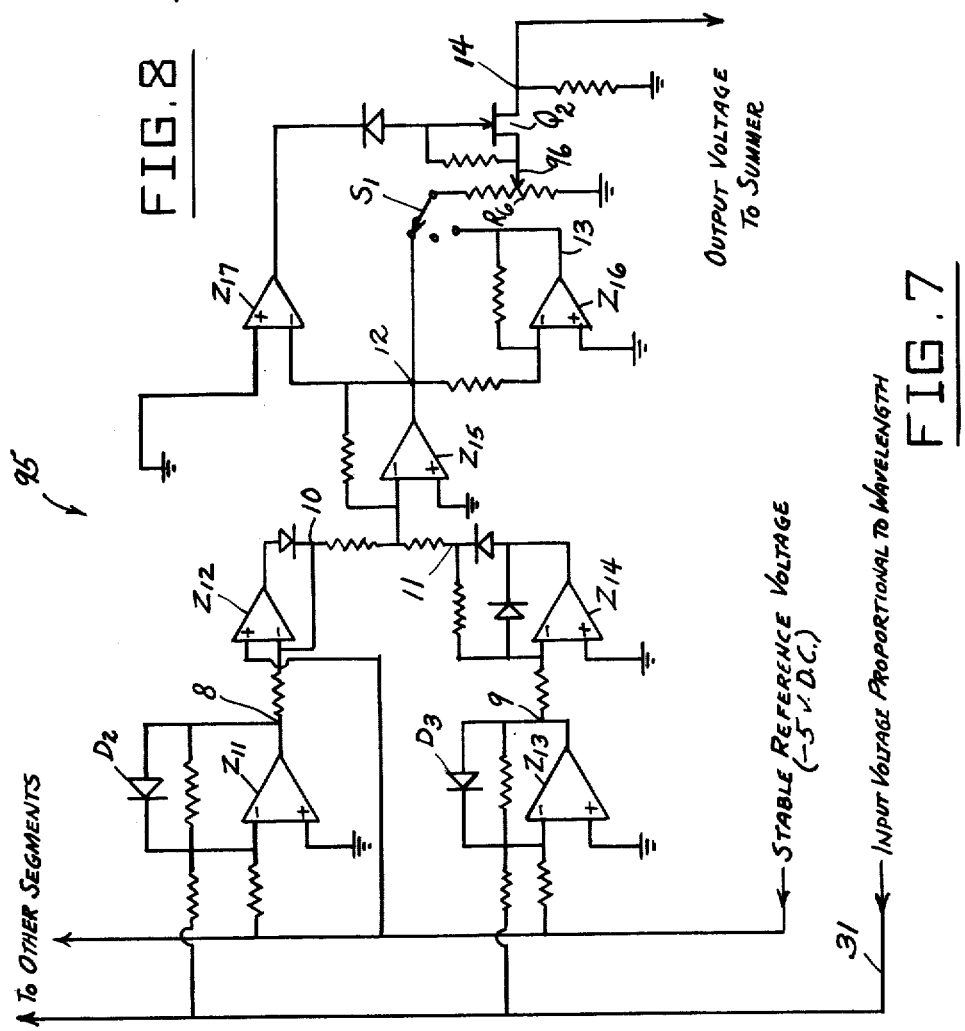
FIG. 8
FIG. 7

WAVELENGTH-CORRECTED SPECTROFLUOROMETER

This invention relates to spectrophotometers, and more particularly to wavelength-compensated spectrofluorometers.

A main object of the invention is to provide a novel and improved spectrofluorometer which is compensated for wavelength-dependent non-linearity characteristics of its components, which is easy to adjust for proper wavelength correction, which employs simple and relatively inexpensive correction components, which is stable in operation, and which has a minimum number of moving parts.

A further object of the invention is to provide an improved spectrofluorometer which is compensated for wavelength-dependent non-linear characteristics of its components by circuit means which can be manually set to automatically provide the required corrections for the various portions of the wavelength spectrum of the spectrofluorometer and which completely covers its operating spectrum, the circuit means acting in response to linear voltage signals derived from a scanning portion of the spectrofluorometer and generating a correct compensation signal for each wavelength in the operating spectrum, the circuit means being easily adjustable in the field, having no continuously moving parts, having a wide range of adjustment, and being capable of providing for proper compensation even in wavelength regions where the wavelength-dependent nonlinear characteristics of the components change rapidly either in magnitude or direction.

A still further object of the invention is to provide an improved spectrofluorometer which is accurately compensated for wavelength-dependent non-linear characteristics of its optical system and measure photomultiplier tube in their response to various emission wavelengths delivered thereto from a sample under study.

A still further object of the invention is to provide an improved spectrofluorometer which is accurately compensated for wavelength-dependent non-linearity of the energy output of its excitation source and the optical system associated with the excitation-scanning portion of the spectrofluorometer.

A still further object of the invention is to provide an improved arbitrary function generator which may be employed to generate correction signals for a spectrofluorometer or other spectrophotometric device over a wide range of operating wavelengths, which includes means for accurate and easy adjustment for desired correction at specific wavelength regions along the operating spectrum of the instrument, which is highly reproducible in adjustment, which is stable in performance, which includes no continuously moving parts subject to wear, which does not require continuous maintenance, which is relatively compact in size, which does not dissipate large operating currents, and which therefore operates at relatively low temperatures, thereby prolonging the useful life of its components.

A still further object of the invention is to provide an improved arbitrary function generator which may be employed to generate an overall wavelength correction curve for a spectrofluorometer or other spectrophotometric device, the function generator having separate segments operable for respective wavelength bands along the operating spectrum of the device, each segment being individually and independently settable to provide the necessary change in the correction curve at this wavelength band, and the segments providing the necessary corrections over the total operating spectrum.

A still further object of the invention is to provide an improved spectrofluorometer which employs an adjustable arbitrary function generator which can be utilized to provide proper wavelength-dependent corrections for variations in photomultiplier sensitivity and corresponding wavelength-dependent errors in the associated optical portions of the spectrofluorometer.

A still further object of the invention is to provide an improved spectrofluorometer which employs an arbitrary function generator which can be utilized to compensate for wavelength-dependent non-linearity of the amount of energy in emission spectral components of a sample, either directly or as a quantum correction.

A still further object of the invention is to provide an improved spectrofluorometer which utilizes an arbitrary function generator to compensate for wavelength-dependent non-linearity in excitation source spectral component energy, either directly or as a quantum correction, and which includes reliable and improved means for monitoring the intensity of its excitation source.

A still further object of the invention is to provide an improved spectrofluorometer which compensates for wavelength-dependent errors by utilizing an arbitrary function generator comprising an electrical circuit and which does not involve any moving parts, thus providing substantial advantages over previously employed devices for obtaining such corrections, such as servo-driven tapped potentiometers and other similar devices employing mechanically driven parts.

Further objects and advantages of the invention will become apparent from the following description and claims, and from the accompanying drawings, wherein:

FIG. 1 is a block diagram showing in relatively simplified form a typical wavelength-corrected spectrofluorometer constructed in accordance with the present invention.

FIG. 2 comprises graphs showing typical wavelength baseline correction curves obtainable in a system such as that illustrated in FIG. 1.

FIG. 3 is a block diagram schematically showing another typical wavelength-corrected spectrofluorometer in accordance with the present invention.

FIG. 5 is a wiring diagram of the coarse arbitrary function generator employed in the spectrofluorometer of FIG. 3.

FIG. 6 comprises a group of graphs illustrating the signals at various portions of the circuit of FIG. 5.

FIG. 7 is a wiring diagram of one of the operating segments employed in the fine arbitrary function generator used in the spectrofluorometer of FIG. 3.

FIG. 8 comprises a group of graphs illustrating the signals at various portions of the circuit of FIG. 7 and how these signals are combined to derive an overall wavelength correction curve.

Figure 1:
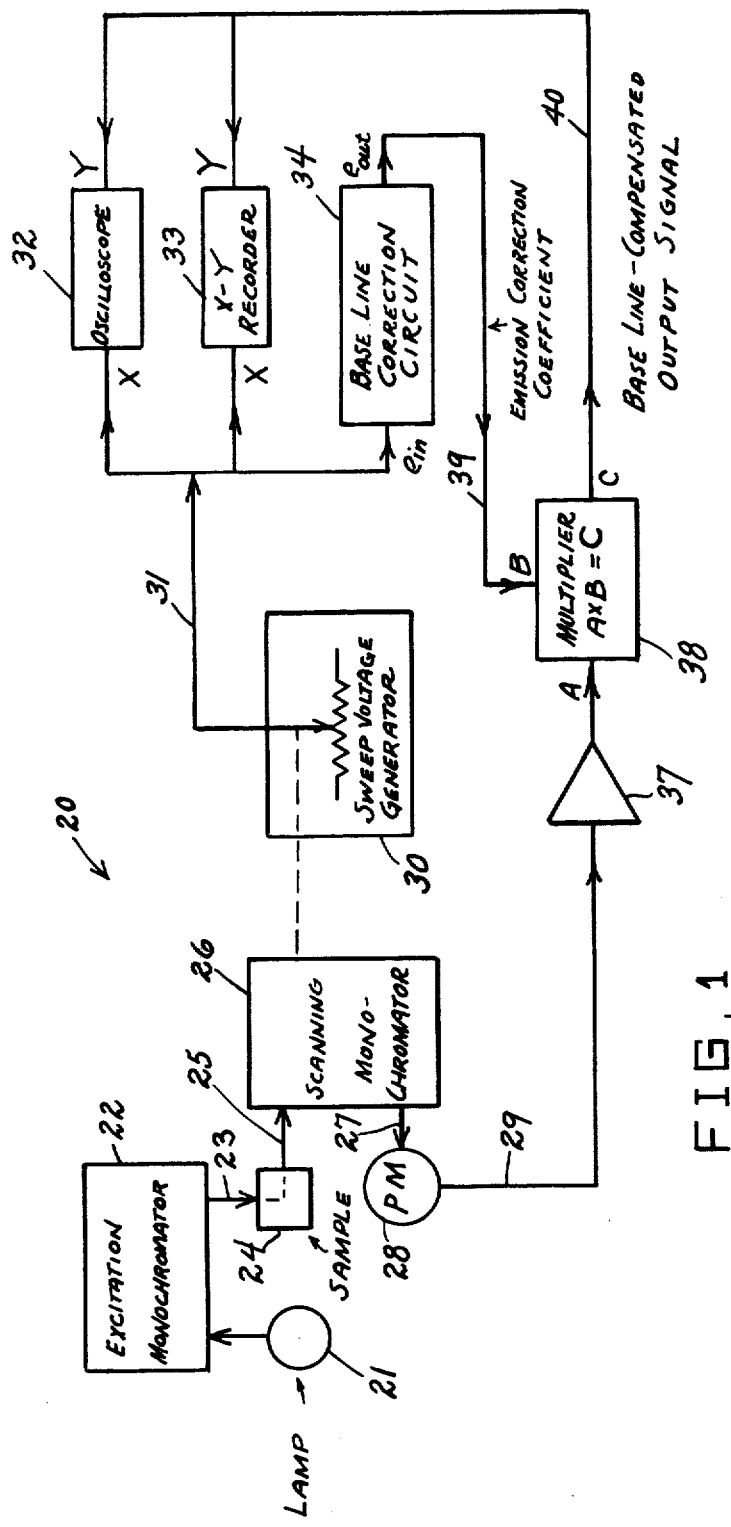

Referring to the drawings, and more particularly to FIG. 1, 20 generally designates a typical spectrofluorometer constructed in accordance with the present invention. The spectrofluorometer 20 comprises a suitable excitation light source 21, such as a white light source, which furnishes light to an excitation monochromator 22 of the wavelength scanning type from which an excitation beam 23 of selected wavelength is directed to a sample cuvette 24 containing a fluorescing sample. The fluorescent emission beam 25 from the sample is delivered to an emission monochromator 26, also of the wavelength scanning type. The emission output beam 27, which at a given time may comprise a characteristic wavelength contained in emission beam 25 selected by scanning monochromator 26, is delivered to a photomultiplier tube 28 which generates output current signals in a line 29, corresponding to the intensities of the respective emission wavelength components from monochromator 26. The drive means of the scanning monochromator 26 is coupled to a sweep voltage generator 30 which thereby generates baseline sweep voltage in its output line 31 for a suitable indicator, such as an oscilloscope 32 or an X-Y recorder 33.

The system thus far described is generally similar to that shown, for example, in U.S. Pat. No. 3,092,722 to H. K. Howerton, issued June 4, 1963. Thus, the excitation monochromator 22 may likewise be of the wavelength scanning type, with suitable drive means, either manual or motorized.

Non-linearities in the wavelength response of photomultiplier tube 28 and the associated optical system cause corresponding wavelength-dependent errors in the measured fluorescence curve, and in accordance with the present invention, compensation is made for these errors by employing a baseline correction circuit 34 to generate emission correction coefficients as a function of emission wavelength. The correction circuit 34 comprises an arbitrary function generator of a suitable type, for example, of the type including circuits similar to that shown in FIG. 7, presently to be described, or equivalent types. The baseline correction circuit 34 is driven by the sweep voltage signal in the line 31, which is a linear signal voltage whose magnitude is proportional to the wavelength increments in the scanning emission monochromator 26. The wave shape of this sweep voltage input signal is shown, for example, at 35 in graph No. 1 in FIG. 6. The output signal from correction circuit 34 is a periodic signal in phase with the sweep voltage signal (and the scanning of monochromator 26) and has a wave shape which is broken up into successive portions corresponding to the required emission coefficients for successive emission wavelength bands. FIG. 2 illustrates at 35' and 36 parts of typical correction coefficient curves which may be derived by a baseline correction circuit 34 in accordance with the present invention. As will be subsequently described, the correction circuit assembly includes means for manual pre-adjustment to suitably shape the correction curve.

In the typical correction system of FIG. 1 the output signal from the measure photomultiplier tube 28 passes through a suitable current-to-voltage amplifier 37 and is delivered to the "A" input of a conventional multiplier 38. The output signal from the baseline correction circuit 34 is delivered via a line 39 to the "B" input of multiplier 38. The output (product) signal at "C" from multiplier 38 is delivered via a line 40 to the Y coordinate terminals of the indicators 32 and 33. The product signal at "C" thus is corrected for the above-mentioned wavelength-dependent errors in the response of photomultiplier tube 28 and the associated fluorescence emission optical system.

FIG. 3 shows another form of corrected spectrofluorometer according to the present invention, designated generally at 41. In this embodiment, correction is made for wavelength-dependent non-linearity in the output energy of the fluorescent emission produced by the sample in cuvette 24. Thus, the spectral components of the emission beam 27 leaving monochromator 26 have different energies in accordance with their wavelengths, and it is necessary to compensate the photomultiplier output for the energy variation, which is non-linear with respect to wavelength. In this case, the linear voltage signal from the scan generator 30 is delivered via line 31 to the inputs of respective fine and coarse arbitrary function generators 42 and 43, presently to be described in detail.

The photomultiplier output signal in line 29 passes through a current-to-voltage converter 37, and the resultant voltage signal is delivered to the "A" input of a conventional product divider 44 via line 45. Product divider 44 may be similar to Model No. 434, manufactured by Analogue Devices Inc., Norwood, Mass. The output signals of the fine and coarse arbitrary function generators 42 and 43 are respectively delivered to the "B" and "D" input terminals of product divider 44. The device 44 multiplies the "A" and "B" signals and divides the product by the "D" signal, the resultant quotient signal appearing at the "C" terminal of device 44. This quotient signal is carried by a line 46. Said quotient signal represents the energy-corrected fluorescence response signal of the sample, and may be read directly on a suitable output indicator 47 through a two-position switch 48 when the switch pole is operated to engage its upper contact 49, as viewed in FIG. 3.

The quotient signal in line 46 may be utilized to derive a quantum-corrected output signal, indicated on the indicating device 47, by multiplying said quotient signal by the linear emission scan signal 35 carried by line 31. Thus, line 31 is connected to one input terminal of a conventional multiplier 50 and line 46 is connected to the other input terminal thereof. The product of these two input signals is delivered via the output line 51 of the multiplier to the lower contact 52 of the two-position switch 48. With the pole of switch 48 engaging said lower contact 52, as shown in FIG. 3, the indicator device 47 will display the quantum-corrected fluorescence response of the sample under test as the fluorescence of the excited sample is scanned by the emission-scanning monochromator 26.

It will be understood that the display device 47 may comprise a meter, providing a display corresponding to a selected stationary wavelength position of the wiper contact of voltage generating device 30, for example, a peak indication as an emission wavelength is located by manually operating the emission scanning monochromator 26, in a manner similar to that described in the above-mentioned Howerton U.S. Pat. No. 3,092,722, or said display device may comprise an oscilloscope, X-Y recorder, or both, for obtaining a spectrum of fluorescence emission wavelengths, as in FIG. 1 or in said Howerton patent.

Figure 4:
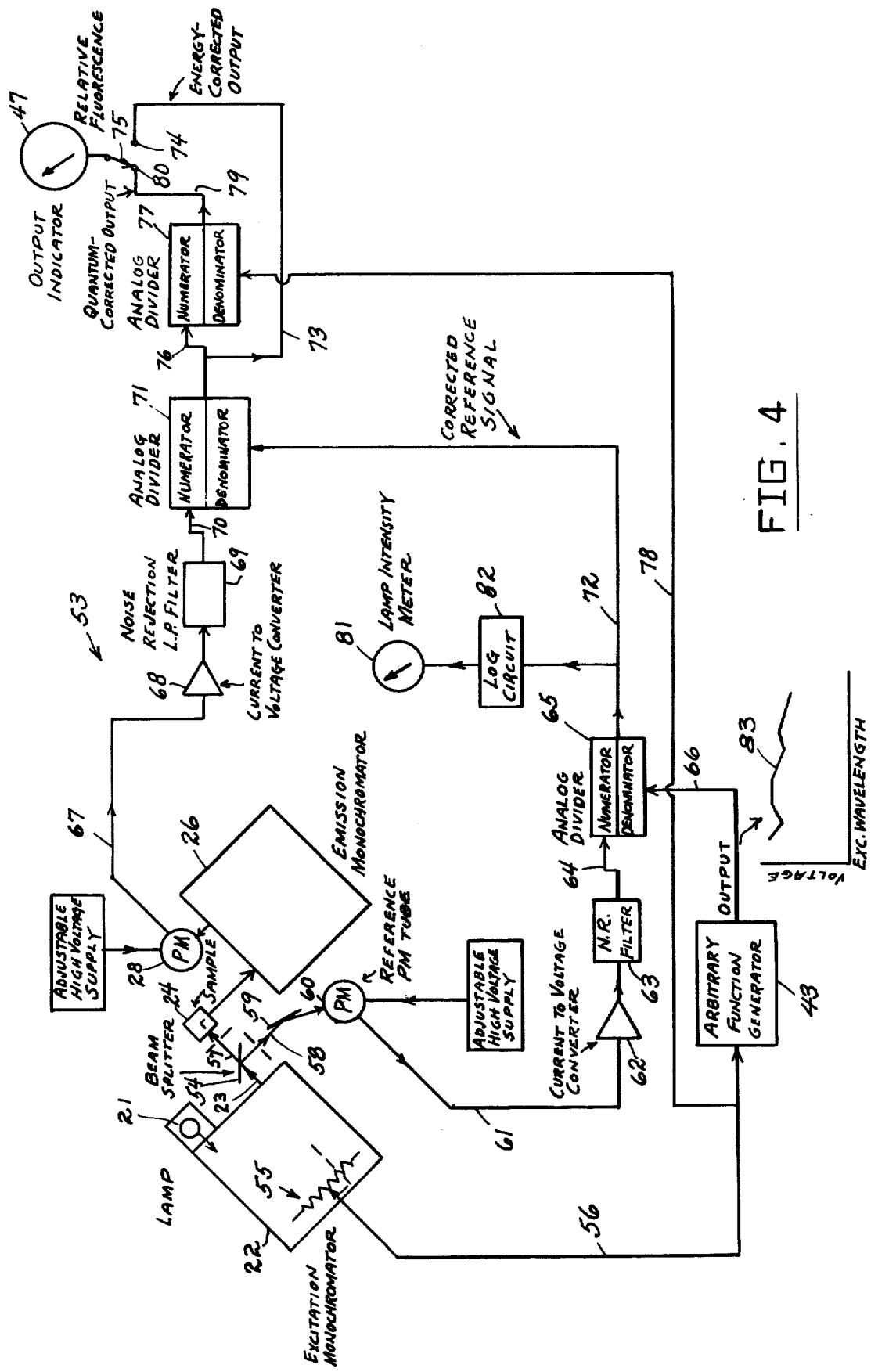
FIG. 4 is a block diagram schematically showing still another spectrofluorometer according to the present invention, wherein the instrument is compensated for wavelength non-linearity of energy output of its excitation system.

In the embodiment illustrated in FIG. 4, the spectrofluorometer, designated generally at 53, employs an arbitrary function generator 43 to compensate for wavelength-dependent non-linearity in the excitation source spectral component energy. The excitation monochromator 22 is provided with a sweep voltage generator 55 similar to that shown in Howerton U.S.

Pat. NO. 3,092,922, which generates a voltage proportional to the incremental excitation wavelength, i.e., the amount of wavelength scan from the starting wavelength, derived from the excitation lamp 21 over the scanning range of monochromator 22, the waveform being similar to that shown at 35 in FIG. 6. This excitation scanning voltage is delivered via a line 56 to the input of the arbitrary function generator 43. The output excitation beam 23 from monochromator 22 is divided by a conventional beam splitter 54 into a measure beam 57 and a reference beam 58. The measure beam 57 is employed in the same manner as previously described to excite fluorescence in a sample in cuvette 24, and the resultant emission is scanned by the emission monochromator 26 and delivered to the photomultiplier tube 28. The reference beam 58 is directed by a reflective surface 59 to a reference photomultiplier tube 60, generating a reference current signal which is carried via a line 61, a current-to-voltage converter 62 and a noise reduction filter 63 to the numerator input line 64 of a conventional analog divider 65. The output of the arbitrary function generator 43 is delivered to the denominator input line 66 of divider 65.

The output current of the measure photomultiplier tube 28 is delivered via a line 67, a current-to-voltage converter 68 and a noise rejection filter 69 to the numerator input line 70 of an analog divider 71. The quotient output signal of divider 65 is delivered via a line 72 to the denominator input of the analog divider 71.

The quotient output signal of divider 71 is delivered via a line 73 to one contact 74 of a two position switch 75 whose pole is connected to the input of a suitable indicator 47, as above described, which may be either a meter or other conventional type of display device.

The quotient output signal of divider 71 is also delivered via a line 76 to the numerator input of another analog divider 77. The excitation scanning voltage in line 56 is delivered via a line 78 to the denominator input of divider 77. The quotient output signal of divider 77 is delivered via a line 79 to the remaining contact 80 of switch 75.

The divider 77 operates to apply a quantum correction to the energy-corrected signal in input line 76. Thus, the indicator 47 may be employed, by means of selector switch 75, to show the energy-corrected measure signal directly, or alternatively, the quantum-corrected measure signal.

The output line 72 of reference signal divider 65 is connected through a log circuit 82 to a lamp intensity meter 81, which is thus utilized to monitor the intensity of the excitation lamp 21.

As shown in FIG. 4, the arbitrary function generator 43 is constructed and adjusted to provide an excitation wavelength-dependent correction voltage curve 83 in accordance with the desired energy compensation corrections for the various excitation wavelengths, known from separately obtained data.

FIG. 5 is a wiring diagram of a typical coarse function generator 43 such as is employed in FIGS. 3 and 4. The function generator output at 66 is formed by summing together in an amplifier 84 the outputs of three circuit segments A, B and C. These circuits operate in a similar manner, and since segment C is the most complex, it will be described in detail.

As shown, amplifier $Z_1$ inverts and sums the -5 v.D.C. reference voltage with the wavelength input voltage at line 31. The input voltage at 31 is shown at 35 in graph No. 1 of FIG. 6, and is a linear function of wavelength.

The $Z_1$ amplifier output at 2 is initially clamped close to zero volts by the diode $D_1$ in the amplifier feedback loop. The waveform at 2 is shown at 85 in graph No. 2 of FIG. 6. The triggering point at 86 is determined by the selected values of the input resistors $R_2$ and $R_3$ of segment C.

Amplifier $Z_2$ operates as a unity gain inverter, giving an output waveform at its output 3 shown at 87 in graph No. 3 of FIG. 6.

The potentiometer wiper 4 can be set during instrument calibration to give any output waveform slope between 87 and 85 in graph No. 4 of FIG. 6.

Because the desired output must be zero volts between the starting wavelength and the triggering point 86, an amplifier $Z_3$ is employed as a comparator to maintain a switch $Q_1$ off in this region. Without this switch the output would remain at a value near but not at zero volts during that time (before triggering point 86). The waveform at 5 is shown in graph No. 5 of FIG. 6, wherein the dotted segments 88 represent different slopes, depending on the setting of potentiometer wiper 4.

The remaining segments B and A operate in a generally similar manner, with the waveform of segment A having a triggering point at 89 (FIG. 5) and the waveform of segment B having a triggering point at 90 (FIG. 5), determined by the selected values of their respective input resistors $R_{22}, R_{23}$, and $R_{12}, R_{13}$, and the slopes of their inclined wave portions 91,92 being determined by the settings of their associated potentiometer wipers 93,94.

The output at 66 is the result of summing the outputs of the three segments A, B and C with the stable -5 v.D.C. reference voltage in the summing amplifier 84, to thereby provide the desired correction curve, shown in graph No. 6 in FIG. 6.

The fine correction function generator 42 comprises a plurality of separately adjustable segment generators, for example, nine separately adjustable segment generators, whose outputs are summed with a stable reference voltage in the same manner as in FIG. 5. The adjustment points are spread selectively across the correction region and arranged so that each is independent of all the others in adjustment. One of the nine segment generators is shown typically at 95 in FIG. 7.

As shown, amplifiers $Z_{11}$ and $Z_{13}$ invert and sum the -5v.D.C. reference voltage with the wavelength input voltage at line 31. The input voltage at 31 is shown at 35 in graph No. 7 of FIG. 8, and is a linear function of wavelength. Amplifiers $Z_{11}$ and $Z_{13}$ use diodes $D_2$ and $D_3$ to clamp the voltage near zero volts.

The output of amplifier $Z_{11}$ at 8 is shown by graph No. 8 in FIG. 8. The output of amplifier $Z_{13}$ at 9 is shown by graph No. 9.

Amplifier $Z_{12}$ acts as a precision clamp to clamp the voltage at -5 v.D.C. The output at 10 is shown by graph No. 10 in FIG. 8.

Amplifier $Z_{14}$ is an inverter with a precision zero clamp. The output at 11 is shown by graph No. 11 of FIG. 8.

The amplifier $Z_{15}$ inverts and sums the outputs at 10 and 11. Its output at 12 is shown by graph No. 12 in FIG. 8.

Amplifier $Z_{16}$ inverts the signal at 12. Its output at 13 is shown by graph No. 13 in FIG. 8.

Amplifier $Z_{17}$ acts as a comparator to turn on switch $Q_2$ only during the time that the signal at 12 is positive. A three-position switch $S_1$ is used to select positive, negative, or no correction.

The output at 14 varies in the bounds shown in graph No. 14 in FIG. 8, depending on how switch $S_1$ and wiper 96 of slope-adjusting potentiometer $R_6$ are set. These are set during calibration of the instrument.

The outputs of the nine segments are summed together to provide the total fine correction function. The manner in which the segments are summed is graphically illustrated in graph No. 15 of FIG. 8. The resultant correction curve is similar to that partially shown by either of the typical correction curves 35' or 36 of FIG. 2.

As in the case of the coarse generator 43, the triggering points of the components of the correction curve are determined by selection of the values of the input resistors of the various segments.

In the circuits shown in FIGS. 5 and 7 it will be seen that the function generators comprise circuit segments which are selectively activated at predetermined differentials between the -5 v.D.C. stable reference voltage and the linear wavelength voltage in input line 31, as determined by the selection of input resistors $R_2,R_3$, etc. for the respective circuit segments.

Also, from the preceding description it will be seen that the switch elements $Q_1$ or $Q_2$ of the circuit segments are selectively activated at predetermined values of the linear wavelength scanning voltage in the input line 31. Thus, in FIG. 6 the triggering point 86 corresponds to a predetermined scanning voltage value and in FIG. 8 the triggering point 99 corresponds to a predetermined scanning voltage value.

While certain specific embodiments of wavelength-corrected spectrophotometric devices have been disclosed in the foregoing description it will be understood that various modifications within the spirit of the invention may occur to those skilled in the art. Therefore it is intended that no limitations be placed on the invention except as defined by the scope of the appended claims.

What is claimed is:

1. A spectrophotometer device including wavelength-scanning monochromator means provided with means to generate a continuous wavelength-proportional linear voltage signal, voltage-responsive circuit means connected to said monochromator means to generate a continuous wavelength-dependent correction signal controlled by and varying in accordance with said linear voltage signal, electrical photosensitive means located to receive radiation from said monochromator means, and circuit means to apply said correction signal to the output of said photosensitive means.

2. The spectrophotometer device of claim 1, and wherein said voltage responsive circuit means comprises a plurality of signal-generating circuit segments, means to selectively activate said circuit segments at predetermined values of said linear voltage signal, and means to combine the outputs of said circuit segments.

3. The spectrophotometer device of claim 1, and wherein said voltage responsive circuit means comprises a plurality of signal-generating circuit segments, means to simultaneously apply a stable reference voltage to said circuit segments, means to selectively activate said circuit segments at predetermined differentials between said linear voltage signal and said reference voltage, and means to combine the outputs of said circuit segments with said stable reference voltage.

4. The spectrophotometer device of claim 1, and wherein said voltage responsive circuit means comprises a plurality of signal-generating circuit segments, each including an electronic switch element, means to selectively activate said switch elements at predetermined values of said linear voltage signal, and means to combine the outputs of said circuit segments.

5. The spectrophotometer device of claim 1, and wherein said voltage responsive circuit means comprises a plurality of circuit segments, means to selectively activate said circuit segments at predetermined values of said wavelength-proportional linear voltage signal, each circuit segment being provided with means to generate a correction signal wave component, means to individually adjust the shapes of said correction signal wave components, and means to combine the outputs of said circuit segments.

6. The spectrophotometer device of claim 5, and wherein the means to individually adjust the shapes of said correction signal wave components comprise respective potentiometers connected in the output portions of the circuit segments.

7. The spectrophotometer device of claim 5, and wherein the means to selectively activate said circuit segments comprises respective voltage-responsive switch means connected in said output portions of the circuit segments and means to substantially suppress the voltages applied to said switch means for predetermined wavelength scanning intervals.

8. The spectrophotometer device of claim 1, and wherein said device comprises a spectrofluorometer wherein said photosensitive means comprises a measure photomultiplier tube, and wherein said last-named circuit means comprises means to combine said correction signal with the output of said photomultiplier tube, whereby to derive a wavelength-corrected measure signal.

9. The spectrophotometer device of claim 8, and wherein said spectrofluorometer is provided with indicator means and quantum-correction means, means to combine said linear voltage signal and said wavelength-corrected measure signal in said quantum-correction means, and means to connect the output of said quantum-correction means to said indicator means.

10. The spectrophotometer device of claim 8, and wherein said spectrofluorometer includes a light source, a sample cuvette and said measure photomultiplier tube arranged to define an optical path, and wherein said scanning monochromator means is included in said optical path.

11. The spectrophotometer device of claim 10, and wherein said scanning monochromator means is located in the portion of said optical path between said sample cuvette and said photomultiplier tube and is arranged to receive fluorescent emission from said sample cuvette.

12. The spectrophotometer device of claim 11, and wherein said voltage responsive circuit means comprises respective fine and coarse correction function generators, each comprising a plurality of signal-generating circuit segments selectively activated at predetermined values of said linear voltage signal and each including means to combine the outputs of said circuit segments, and wherein the means to combine the correction signal with the output of the photomultiplier tube comprises means to multiply the output of the fine function generator with the output of the photomultiplier tube and means to divide the resultant product by the output of the coarse function generator, whereby to derive the wavelength-corrected measure signal.

13. The spectrophotometer device of claim 12, and wherein said spectrofluorometer includes indicator means and quantum-correction means, means to combine said linear voltage signal and said wavelength-corrected measure signal in said quantum-correction means, and means to connect the output of said quantum-correction means to said indicator means.

14. The spectrophotometer device of claim 13, and wherein said quantum-correction means is a multiplier.

15. The spectrophotometer device of claim 1, and wherein said device comprises a spectrofluorometer wherein said photosensitive means comprises a measure photomultiplier tube, and means to combine said correction signal with the output of said photomultiplier tube, whereby to derive a wavelength-corrected measure signal, wherein said spectrofluorometer includes a light source, a sample cuvette and said measure photomultiplier tube arranged to define an optical path, said wavelength-scanning monochromator means being located in the portion of said optical path between said light source and said sample cuvette and being arranged to deliver excitation monochromatic light to said sample cuvette.

16. The spectrophotometer device of claim 1, and wherein said device comprises a spectrofluorometer including a light source, an excitation scanning monochromator, a sample cuvette arranged to receive an excitation beam from said excitation monochromator, and an emission scanning monochromator arranged to receive an emission beam from said cuvette, and wherein said photosensitive means comprises a measure photomultiplier tube arranged to receive scanning emission beams from said emission monochromator to generate a measure signal, said linear voltage signal generating means being driven by said excitation scanning monochromator, a reference photosensitive device arranged to receive a portion of the excitation beam and generating a reference signal, and means to combine said reference signal with said correction signal to generate a corrected reference signal, and wherein said last-named circuit means comprises means to combine said corrected reference signal with said measure signal, whereby to derive a wavelength-corrected measure signal.

17. The spectrophotometer device of claim 16, and wherein said means to combine said reference signal with said correction signal comprises a divider wherein the correction signal is employed as the denominator.

18. The spectrophotometer device of claim 16, and wherein the means to combine the corrected reference signal with said measure signal comprises a divider wherein the corrected reference signal is employed as the denominator.

19. The spectrophotometer device of claim 16, and wherein said spectrofluorometer includes indicator means and quantum-correction means, means to combine said linear voltage signal and said wavelength-corrected measure signal in said quantum-correction means, and means to connect the output of said quantum-correction means to said indicator means.

20. The spectrophotometer device of claim 19, and wherein said quantum-correction means is a divider and said linear voltage signal is applied thereto as a denominator.

21. A spectrofluorometer comprising a source of radiant energy, a photosensitive electrical member, a sample holder between said source and said photosensitive member, wavelength-scanning monochromator means including an excitation monochromator between said source and said sample holder and an emission monochromator between said sample holder and said photosensitive member, said monchromator means being provided with means to generate a linear sweep voltage proportional to scanning wavelength, indicator means, circuit means connecting the output of said photosensitive member to said indicator means, a voltage-sensitive arbitrary function generator arranged to generate respective correction signals for different input voltages, circuit means connecting the output of said linear sweep voltage generating means to the input of said arbitrary function generator, and means to modify the output of said photosensitive member in accordance with the output of said arbitrary function generator, whereby said indicator means receives scanning wavelength-corrected signals from said photosensitive member.

22. The spectrofluorometer of claim 21, and wherein said excitation monochromator is of the wavelength-scanning type and said sweep voltage generating means is driven by said excitation monochromator.

23. The spectrofluorometer of claim 21, and wherein said emission monochromator is of the wavelength-scanning type and said sweep voltage generating means is driven by said emission monochromator.

24. The spectrofluorometer of claim 21, and wherein said indicator is of the spectral display type having wavelength sweep means and the output of said sweep voltage generating means is connected to said wavelength sweep means.

25. The spectrofluorometer of claim 21, and wherein said arbitrary function generator comprises a plurality of circuit segments, means to selectively activate said circuit segments at predetermined values of said linear sweep voltage, each circuit segment being provided with means to generate a correction signal wave component, means to individually adjust the shapes of said correction signal wave components, and means to combine the outputs of said circuit segments.

26. The spectrofluorometer of claim 25, and wherein the means to adjust the shapes of said correction signal wave components comprises respective potentiometers connected in the output portions of the circuit segments and wherein the means to selectively activate said circuit segments comprises respective voltage-responsive electronic switches connected in said output portions of the circuit segments and means to substantially suppress the voltages applied to said switches for predetermined wavelength scanning intervals.

* * * * *